United States Patent [19]
Suzuki et al.

[11] Patent Number: 5,761,642
[45] Date of Patent: Jun. 2, 1998

[54] DEVICE FOR RECORDING AND /OR REPRODUCING OR TRANSMITTING AND/ OR RECEIVING COMPRESSED DATA

[75] Inventors: Hiroshi Suzuki, Saitama; Kenzo Akagiri, Kanagawa; Osamu Shimoyoshi, Kanagawa; Makoto Mitsuno, Kanagawa, all of Japan

[73] Assignee: Sony Corporation, Tokyo, Japan

[21] Appl. No.: 207,947

[22] Filed: Mar. 8, 1994

[30] Foreign Application Priority Data

Mar. 11, 1993 [JP] Japan ................ 5-050545

[51] Int. Cl.$^6$ ................ G10L 9/08; H03M 7/30
[52] U.S. Cl. ................ 704/503; 704/201; 704/229
[58] Field of Search ................ 395/2.1, 2.13, 395/2.21; 381/29, 30; 704/200, 211, 212, 201, 500, 501, 503, 504, 229

[56] References Cited

U.S. PATENT DOCUMENTS

| | | | |
|---|---|---|---|
| 5,197,087 | 3/1993 | Iwahashi et al. | 375/122 |
| 5,243,588 | 9/1993 | Maeda et al. | 369/54 |
| 5,244,705 | 9/1993 | Tsurushima et al. | 428/64 |
| 5,311,561 | 5/1994 | Akagiri | 375/122 |
| 5,375,189 | 12/1994 | Tsutsui | 395/2.38 |
| 5,473,727 | 12/1995 | Nishiguchi et al. | 395/2.31 |
| 5,502,789 | 3/1996 | Akagiri | 395/2.13 |

FOREIGN PATENT DOCUMENTS

| | | |
|---|---|---|
| 0 466 031 A2 | 9/1991 | European Pat. Off. . |
| 0 620 653 A2 | 3/1994 | European Pat. Off. ......... H03M 7/30 |
| 2 257 606 | 1/1993 | United Kingdom ............ H03M 7/40 |
| WO 92/17884 | 10/1992 | WIPO ................ G11B 20/10 |

OTHER PUBLICATIONS

Digital Coding of Speech in Sub-bands, Crochiere et al., The Bell System Technical Journal vol. 55, No. 8, Oct. 1976.
Polyphase Quadrature Filters—A New Subband Coding Technique, Rothweiler, ICASSP Apr. 14, 15 and 16, 1983, Boston, vol. 3, pp. 1280–1283.
Subband/Transform Coding Using Filter Bank Designs Based on Time Domain Aliasing Cancellation, Princen et al., ICASSP 1987 IEEE, pp. 2161–2164.

*Primary Examiner*—Allen R. MacDonald
*Assistant Examiner*—Richemond Dorvil
*Attorney, Agent, or Firm*—Limbach & Limbach LLP

[57] ABSTRACT

A device for recording and/or reproducing or transmitting and/or receiving compressed data includes decoding circuits 31 to 33 for performing expansion during the compression process is disclosed. An error produced during the compression process is calculated by an input/output error calculating circuit 41 from the input data and data compressed by adaptive bit allocation encoding circuits 22 to 24 and expanded by the decoding circuits 31 to 33, and bit allocation is again calculated on the basis of the error produced during the compression process, with the input data remaining as it is. The bit allocation re-calculated in this manner is quantized by the encoding circuits 22 to 24. Besides, data annulling the error produced during the compression process is formulated by the input/output error calculating circuit 41 and summed to the input signals for subsequent quantization. Compressed signals suited to the input signals may be obtained even if the model for the auditory sense or constants occasionally employed are not suited to the input signals, or if the input signals are unanticipated signals.

41 Claims, 12 Drawing Sheets

5,761,642

DEVICE FOR RECORDING AND /OR REPRODUCING OR TRANSMITTING AND/ OR RECEIVING COMPRESSED DATA

BACKGROUND OF THE INVENTION

This invention relates to a device for recording and/or reproducing or transmitting and/or receiving compressed data, that is bit-compressed digital audio signals or the like. More particularly, it relates to a device for recording and/or reproducing or transmitting and/or receiving the compressed data having a feedback circuit configuration in its processing circuit system for adaptability to input signals for assuring optimum compression and expansion of the compressed data.

The present Assignee has already proposed in our U.S. Pat. Nos. 5,243,588 and 5,244,705 a technique consisting in bit-compressing input digital audio signals and recording the bit-compressed signals in a burst fashion with a pre-set data volume as a recording unit.

This technique resides in employing a magneto-optical disc as a recording medium and recording and/or reproducing AD (adaptive differential) PCM audio data as prescribed in audio data formats such as CD-I (CD-Interactive) or CD-ROM XA. The AD-PCM audio data is recorded in a burst fashion on the magneto-optical disc with e.g. 32 sectors of the AD-PCM data and, for interleaving, a few linking sectors as one recording unit.

Several modes may be selected of the AD-PCM audio data in the recording and/or reproducing device employing the magneto-optical disc. For example, a level A with a compression ratio twice that of the conventional compact disc (CD) and a sampling frequency of 37.8 kHz, a level B with a compression ratio four times of that of the conventional compact disc (CD) and a sampling frequency of 37.8 kHz and a level C with a compression ratio eight times of that of the conventional compact disc (CD) and a sampling frequency of 18.9 kHz, are prescribed. That is, with the above-mentioned level B, the digital audio data is compressed to approximately one/fourth of the original volume, with the replay time of the disc recorded with the level B mode being four times of that with the standard CD format. This indicates that the recording/reproducing time about as long as that achieved with a standard size disc of 12 cm in diameter may be achieved with a smaller sized disc and hence the device may be reduced in size.

However, since the rotational speed of the disc is the same as that of a standard CD, the amount of the compressed data obtained with the level B per a pre-set time is four times of that of the standard CD. Consequently, the same compressed data is read in superimposition four times, in a time unit of e.g. a sector or a cluster, and only one of the four superimposed compressed data is transmitted for audio reproduction. Specifically, during scanning or tracking a spiral recording track, track jump of returning to the starting track position is performed for each disc revolution for repeatedly tracking the same track four times on end by way of reproduction. This indicates that at least one sound compressed data of the four superposed reading operations suffices and hence the disclosed technique is strong against errors caused by disturbances so that it may be desirably applied above all to a small-sized portable type device.

The present Assignee has also proposed in our co-pending U.S. patent application Ser. No. 07/553,608 filed Jul. 18, 1990, now U.S. Pat. No. 5,197,087, and U.S. patent application Ser. No. 07/664,300 filed Mar. 4, 1991, which was abandoned in favor of continuing U.S. patent application Ser. No. 08/029,988 filed Mar. 12, 1993, now U.S. Pat. No. 5,502,789, a technique in which the processing block is changed during the compression process responsive to large amplitude changes of the input signals for improving temporal resolution and response characteristics of the processing system.

With this technique, the temporal resolution and the frequency resolution of a processing system, which are contrary to each other, are changed depending on the properties of input signals for improving adaptability to input signals and producing high sound quality as perceived by the aural sense. For transform coding employing orthogonal transform, as one of numerous high efficiency compression methods, such technique is particularly effective for combatting the pre-echo which is produced when input signals having acute changes in signal amplitude are entered. By the pre-echo is denoted a phenomenon in which, if signals in an orthogonal transform block are compressed or expanded with orthogonal transform or inverse orthogonal transform while larger amplitude changes are produced within the transform block, temporally uniform quantization noise is generated in the block so that the quantization noise thus produced becomes objectionable to the aural sense in the small amplitude signal portion that was present before the orthogonal transform or the inverse orthogonal transform.

Meanwhile, when implementing the signal recording and/or reproducing device using the above-mentioned technique, the transfer function of each processing system may be set to unity, that is the device may be designed without errors or distortions, if reduction in the information volume is not undertaken during the compression process. However, if the reduction in the information volume is undertaken with such device, the transfer function is not equal to unity but some error or distortions are produced. Consequently, with the above device, errors due to changes in the transfer function are summed to and compressed along with errors between the input and the output caused by the reduction in the information volume.

On the other hand, the reduction in the information volume may be achieved most effectively by taking into account certain characteristics of the human aural sense, such as minimum audibility characteristics, equal loudness curves or masking. However, these characteristics are measured statically, while the characteristics for dynamic signals, such as music signals, may not be known precisely. Consequently, an optimum model for the aural sense or characteristics, as required for the reduction in the information volume, can be set only with extremely difficult processing operations.

OBJECT AND SUMMARY OF THE INVENTION

In view of the above-depicted status of the art, it is an object of the present invention to provide a device for recording and/or reproducing compressed data, that is a high-efficiency encoding/decoding device, in which, for producing the compressed data having optimum characteristics, the feedback circuit configuration is employed during the compression process for preventing the errors from being produced due to non-fitting of the model to the aural sense.

According to the present invention, there is provided a device for recording and/or reproducing or transmitting and/or receiving compressed data including decoding circuits for performing expansion during the compression process. An error produced during the compression process is calculated by an input/output error calculating circuit from the input data and data compressed by adaptive bit allocation encoding circuits and expanded by the decoding circuits, and bit allocation is again calculated on the basis of the error produced during the compression process, with the input data remaining as it is. The bit allocation re-calculated in this manner is quantized by the encoding circuits. Besides, data annulling the error produced during the compression process is formulated and summed to the input signals for subsequent quantization. In this manner, the errors and/or distortion produced during the compression and expansion process may be effectively decreased.

The re-processing may be performed a plurality of number of times whenever the necessity arises. The abovementioned two techniques may be selectively used or used in combination depending on the types of the input signals and/or the applications.

The present invention thus provides a recording and/or reproducing device or a transmission system for compressed data in which a feedback circuit configuration is employed for the compression process for minimizing the distortion otherwise produced in the processing system for producing optimum results of compression to implement the device with a higher sound quality and a higher efficiency.

DESCRIPTION OF THE PREFERRED EMBODIMENT

Figure 1:
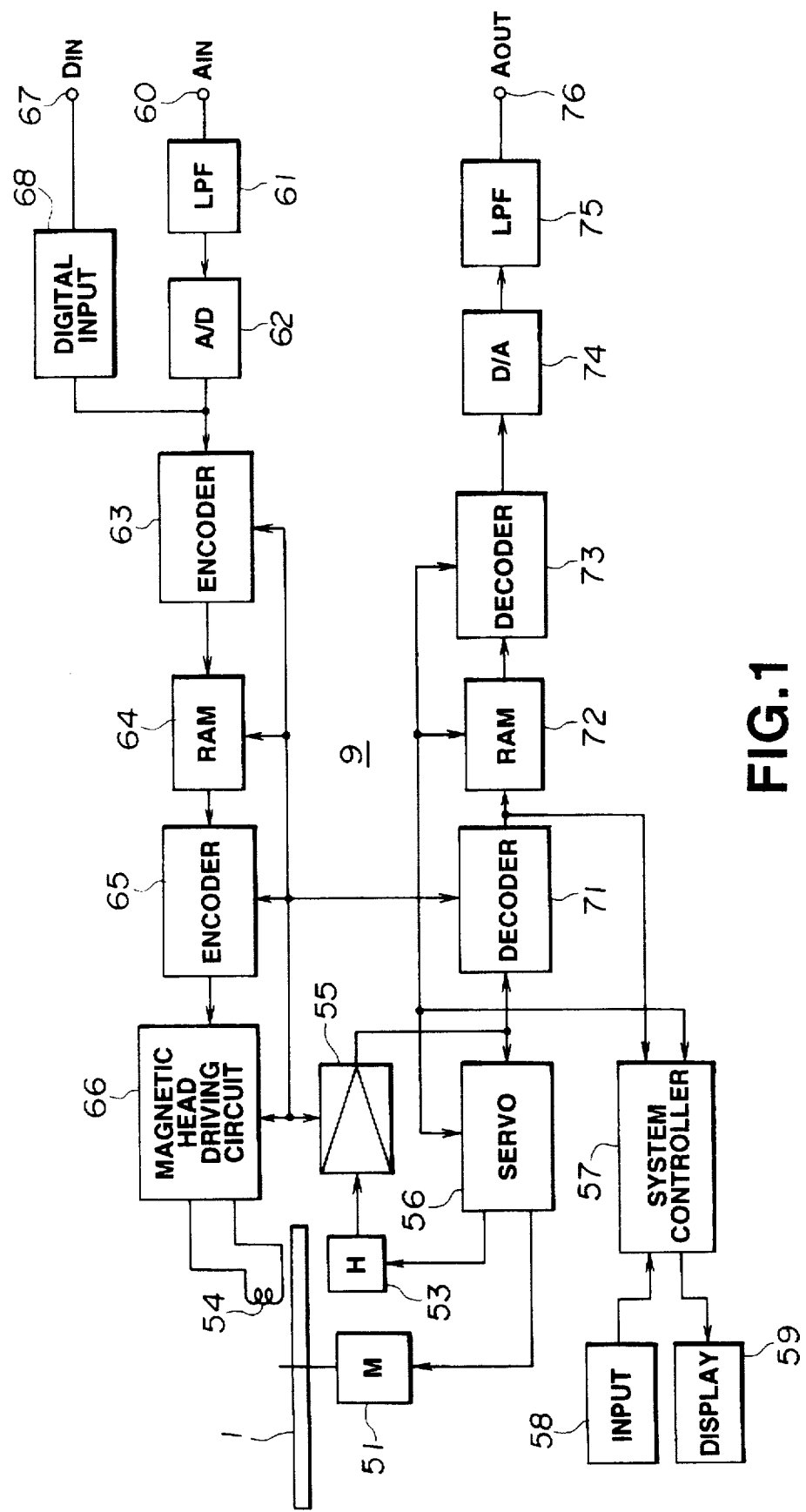
FIG. 1 is a block circuit diagram showing an illustrative constitution of a disc recording/reproducing device for compressed data according to the present invention.

Referring to the drawings, a preferred embodiment of the present invention will be explained in detail.

FIG. 1 shows, in a block circuit diagram, a schematic arrangement of a preferred embodiment of the recording and/or reproducing compressed data according to the present invention.

In FIG. 1, there is shown a schematic arrangement of an embodiment of the recording and/or reproducing device for compressed data of the present invention in a block circuit diagram.

In the magneto-optical disc recording/replay unit of the compressed data recording and/or reproducing device, shown in FIG. 1, the magneto-optical disc 1 run into rotation by a spindle motor 51 is employed as a recording medium. In recording data on the magneto-optical disc 1, a modulated magnetic field corresponding to the recording data is applied by a magnetic head 54, while the magneto-optical disc 1 is irradiated with a laser light beam by the optical head 53, by way of performing the recording by magnetic field modulation for recording data along a recording track of the magneto-optical disc 1. In reproducing the recorded data, the recording track on the magneto-optical disc 1 is traced by a laser light beam for reproduction photomagnetically.

The optical head 53 is made up of a laser light source, such as a laser diode, optical components, such as a collimator lens, an objective lens, a polarized light beam splitter or a cylindrical lens, and a photodetector having a light receiving section having a pre-set pattern. The optical head 53 is placed at a position facing the magnetic head 54 with the magneto-optical disc 1 in-between. For recording data on the magneto-optical disc 1, the magnetic head 54 is driven by a head driving circuit 66 of a recording system as later explained for applying a modulated magnetic field corresponding to the recording data to the disc 1, while a laser light beam is radiated by the optical head 53 on a target track of the magneto-optical disc 1 for thermo-magnetic data recording in accordance with magnetic field modulation. Besides, the optical head 53 detects the reflected laser light from the target track for detecting the focusing error by an astigmatic method, while detecting the tracking error by a push-pull method. When reproducing data from the magneto-optical disc 1, the optical head 53 detects the focusing error or the tracking error, while also detecting the difference in the angle of polarization (the Kerr rotation angle) of the reflected light from the target track for generating the playback signals.

An output of the optical head 53 is supplied to an RF circuit 55 which extracts the above-mentioned focusing error signals and the tracking error signals from an output of the optical head 53 to transmit the extracted signals to a servo control circuit 56. The RF circuit 55 also converts the replay signals into bi-level signals which are supplied to a decoder 71 of the reproducing system as later explained.

The servo control circuit 56 is made up of, for example, a focusing servo control circuit, a tracking servo control circuit, a spindle servo control circuit, a thread servo control circuit and so forth. The focusing servo control circuit focusing-controls the optical system of the optical head 53 so that the focusing signal is reduced to zero. The tracking servo control circuit tracking-controls the optical system of the optical head 53 so that the tracking signal is reduced to zero. The spindle motor servo controlling circuit controls the spindle motor 51 for running the magneto-optical disc 1 into rotation at a pre-set rotational velocity, for example, at a constant linear velocity. The thread servo control circuit shifts the optical head 53 and the magnetic head 54 to a target track position of the magneto-optical disc 1 as designated by a system controller 57. The servo control circuit 56 transmits the information indicating the operating states of the various components controlled by the servo control circuit 56 to the system controller 57.

A key input unit 58 and a display 59 are connected to the system controller 57 which controls the recording system and the reproducing system under the operating mode as designated by the input information entered at the key input unit 58. The system controller 57 also supervises the recording position and the replay position on the recording track traced by the optical head 53 and the magnetic head 54 based on the sector-based address information reproduced from the recording track of the magneto-optical disc 1 by Q-data such as header time or sub-code data. Besides, the system controller 57 causes the replay time to be displayed on the display 59 based on the data compression ratio in the bit compression mode and the playback position information on the recording track.

For playback time display, the sector-based address information (absolute time information) reproduced from the recording track of the magneto-optical disc 1 by header time or sub-code Q data is multiplied by a reciprocal of the data compression ratio, such as 4 for the data compression ratio of ¼, to find the actual time information, which is displayed on the display 9. Meanwhile, during recording, if the absolute time information is pre-recorded on the recording track of the magneto-optical disc 1, that is if the magneto-optical disc 1 is pre-formatted, the current position may be displayed by the actual recording time by reading the pre-formatted absolute time information and multiplying it with a reciprocal of the data compression ratio.

In a recording system of the present disc recording/ reproducing device, analog audio input signals AIN are supplied from an input terminal 60 via a low-pass filter 61 to an A/D converter 62 which quantizes the analog audio input signals AIN. Digital audio signals produced by the A/D converter 62 are supplied to an adaptive transform coding (ATC) PCM encoder 63. On the other hand, the digital audio input signals DIN from an input terminal 67 are supplied via an input interfacing circuit 68 to the ATC encoder 63 in which bit compression or data compression is performed on the digital audio PCM data of a preset transfer speed which is the input signal AIN quantized by the A/D converter 62. Although the following description is made in connection with the compression rate of four, the present embodiment is not dependent on the specific value of the compression rate which may be set to desired values depending on particular applications.

The memory 64 is a buffer memory which is controlled as to data writing and data reading by the system controller 57 for transiently storing ATC data supplied from the ATC encoder 63 for recording on the disc when the necessity arises. That is, the compressed audio data supplied from the ATC encoder 63 has its data transfer rate diminished to one-fourth of the data transfer rate for the standard CD-DA format of 75 sector per sec, or to 18.75 sectors per sec. The compressed data is written continuously on the memory 64. Although it suffices to record the compressed data (ATC data) at a rate of one per eight sectors, as mentioned above, such recording in every eight sectors is practically impossible, so that sector-continuous recording is performed, as later explained. This recording is performed in a burst fashion at the data transfer rate of 75 sectors per sec, which is the same as the standard CD-DA format, with a cluster made up of pre-set plural sectors, for example, 32+several sectors, as a recording unit, with the interposition of a non-recording period. That is, in the memory 64, the ATC audio audio data, continuously written at a low transfer rate of 9.375 (=75/8) sectors per sec associated with the bit compression mode, is read as the recorded data in a burst fashion at the above-mentioned transfer rate of 75 sectors per sec. The overall data transfer rate of the data read out and recorded, inclusive of the non-recording period, is the low rate of 18.75 sectors per sec. However, the instantaneous data transfer rate within the time period of the recording operation performed in a burst fashion is the above-mentioned standard data transfer rate of 75 sectors per sec. Consequently, if the disc rotating velocity is the same as that of the standard CD-DA format, that is a constant linear velocity, recording is made at the same recording density and with the same recording pattern as those of the CD-DA format.

The ATC audio data read from the memory 64 at the above-mentioned instantaneous transfer rate of 75 sectors per sec, that is the recorded data, are supplied to an encoder 65. The unit by which the data string supplied from the memory 64 to the encoder 65 is recorded for each recording is a cluster consisting of plural sectors, such as 32 sectors, and several cluster-linking sectors arrayed ahead and at back of the cluster. The clusterlinking sectors are selected to be longer than an interleaving length at the encoder 65 so that data of neighboring clusters are not affected by data interleaving operations.

The encoder 65 performs encoding for error correction, such as parity appendage and data interleaving, or EFM encoding, on the recording data supplied from the memory 64 in the burst fashion. The recorded data encoded by the encoder 65 is supplied to a magnetic head driving circuit 66. The magnetic head 54 is connected to the magnetic head driving circuit 66 which drives the magnetic head 54 for applying the modulated magnetic field corresponding to the recording data to the magneto-optical disc 1.

The system controller 57, controlling the memory 64 as described above, also controls the recording position in such a manner that the recorded data read in the burst fashion by the memory control is continuously recorded on the recording track of the magneto-optical disc 1. The recording position is controlled by supervising the recording position of the recorded data read in the burst fashion by the system controller 57 from the memory 64 and by supplying a control signal designating the recording position on the recording track of the magneto-optical disc 1 to the servo control circuit 56.

The reproducing system of the recording/reproducing unit for the magneto-optical disc 1 is hereinafter explained. The reproducing system is employed for reproducing the recorded data continuously recorded on the recording track of the magneto-optical disc 1, and includes a decoder 71 to which a playback output produced on tracing the recording track of the magneto-optical disc 1 with a laser light beam from the optical head 53 is supplied after conversion into bi-level data by the RF circuit 55. Recorded data may be read not only from the magneto-optical disc 1 but also from the replay-only optical disc of the same type as the so-called compact disc.

The decoder 71 is a counterpart of the encoder 65 of the above-described recording system and performs the above-mentioned decoding for error correction or EFM decoding on the bi-level playback output of the RF circuit 55, while reproducing the ATC audio data at a transfer rate of 75 sectors per sec which is faster than the normal transfer rate. The playback data obtained by the decoder 71 is supplied to a memory 72.

The memory 72 has its data writing and reading controlled by the system controller 57 in such a manner that the playback data supplied from the decoder 71 at the transfer rate of 75 sectors per sec is written therein in the burst fashion at the transfer rate of 75 sectors per sec. On the other hand, the playback data written in the burst fashion at the transfer rate of 75 sectors per sec in the memory 72 is continuously read from the memory 72 at the normal transfer rate of 18.75 sectors per sec.

The system controller 57 controls the memory 72 in such a manner as to write the replay data in the memory 72 at the transfer rate of 75 sectors per sec and to continuously read the replay data from the memory 72 at the above-mentioned transfer rate of 18.75 sectors per sec. The system controller 57, controlling the memory 72 as described above, controls the replay position in such a manner that the replay data written in a burst fashion from the memory 72 under control by the system controller 57 is continuously reproduced from the recording track of the magneto-optical disc 1. The replay position is controlled in such a manner that the replay position of the replay data read in the burst fashion from the memory 72 is supervised by the system controller 57 and a control signal designating the replay position on the recording track of the magneto-optical disc 1 or the optical disc is transmitted to the servo control circuit 56.

The ATC audio data obtained as the replay data continuously read from the memory 72 at the transfer rate of 18.75 sectors per sec is supplied to an ATC decoder 73. The ATC decoder 73 expands the ATC data by a factor of eight by way of bit expansion for reproducing 16-bit digital audio data. The digital audio data from the ATC decoder 73 is supplied to a D/A converter 74.

The D/A converter 74 translates the digital audio data supplied from the ATC decoder 73 into analog signals for forming analog audio output signals AOUT. The analog audio output signals AOUT are outputted at an output terminal 76 via a low-pass filter 75.

The high efficiency compression and encoding is explained in detail. That is, the technique of performing high efficiency encoding on input digital signals, such as audio PCM signals, by sub-band coding (SBC), adaptive transform coding (ATC) and adaptive bit allocation, is explained by referring to FIG. 2 ff.

Figure 2:
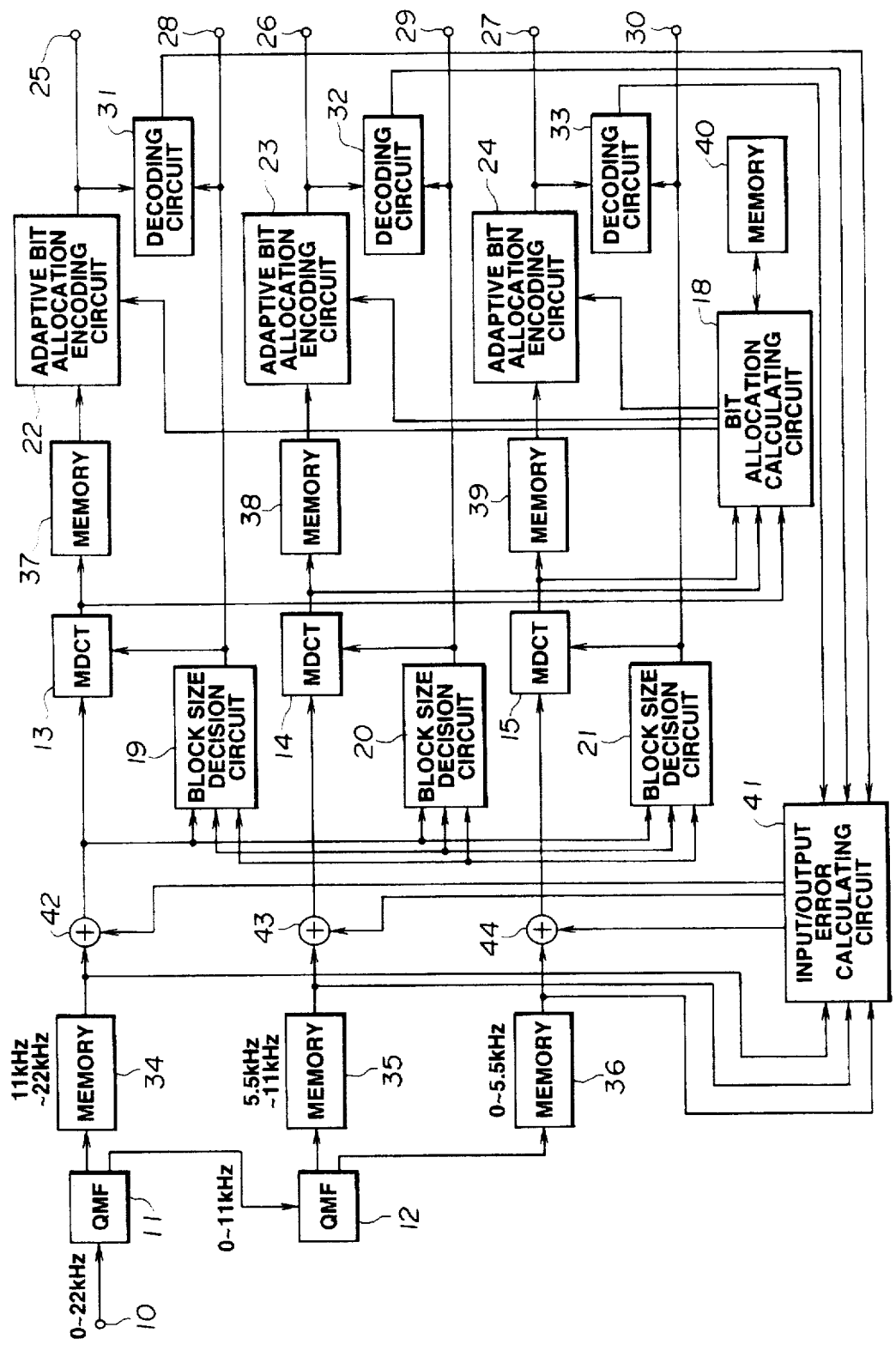
FIG. 2 is a block circuit diagram showing a concrete example of a high efficiency compression encoder usable for bit rate compression and coding for the present embodiment.
Figure 3A:
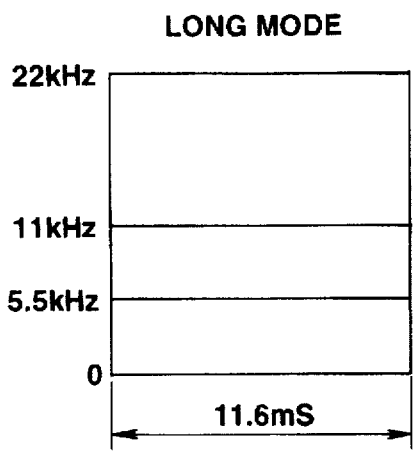
FIGS. 3A to 3D show the construction of orthogonal transform blocks employed for bit compression.
Figure 3B:
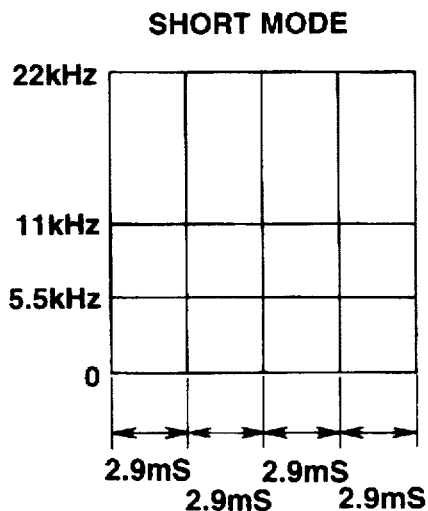
Figure 3C:
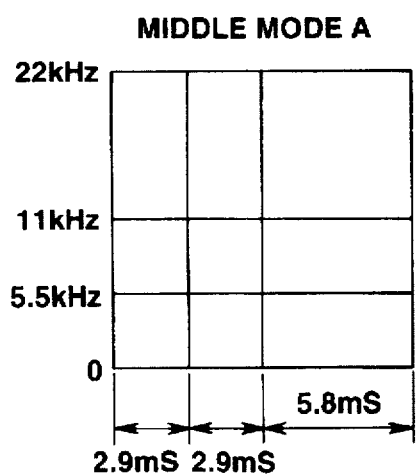
Figure 3D:
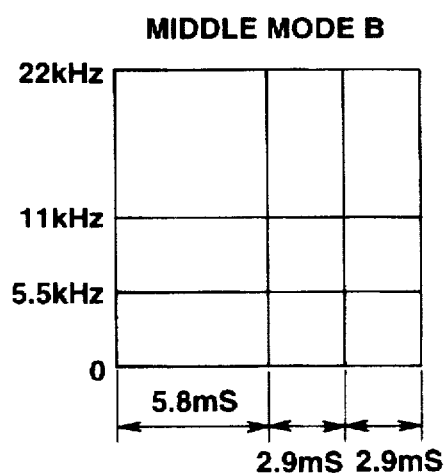

In the concrete high-efficiency encoding device, shown in FIG. 2, the frequency range of the input digital signals is divided into plural frequency bands so that two neighboring lower most bands are of an equal bandwidth and the bandwidths become progressively broader in the direction of increasing frequencies. The input digital signals are orthogonal transformed from one frequency band to another to produce frequency-domain spectral data which is encoded with the numbers of bits which are adaptively allocated on the basis of so-called critical bands for the lower frequency range for taking into account the characteristics of the human aural sense as later explained and on the basis of smaller width bands sub-divided from the critical bands for the higher frequency range for raising the block floating efficiency. This block usually becomes the block subject to the quantization noise, that is the block in which the quantization noise is produced. Besides, with the present embodiment, the block size or block length is adaptively changed prior to orthogonal transform depending on input signals and the floating is performed on the block basis.

Referring to FIG. 2, audio PCM signals having a frequency range of 0 to 22 kHz, with the sampling frequency of 44.1 kHz, are supplied to an input terminal 10. These input signals are divided by a frequency dividing filter 11, such as, for example, a QMF filter, into signals having a frequency range of 0 to 11 kHz and a frequency range of 11 to 22 kHz. The signals having the frequency range of 0 to 11 kHz are similarly divided by a similar frequency dividing filter 12, such as a QMF filter, into signals having a frequency band of 0 to 5.5 kHz and signals having a frequency band of 5.5 kHz to 11 kHz. The signals in the frequency range of 11 to 22 kHz from the frequency dividing filter 11 are stored in a memory 34 and summed to output correction signals of an input/output error calculating circuit 41 so as to be transmitted to an MDCT circuit 13, typical of an orthogonal transform circuit, for MDCT processing. Similarly, the signals in the frequency range of 5.5 to 11 kHz from the frequency dividing filter 12 are stored in a memory 35 and summed to output correction signals of the input/output error calculating circuit 41 so as to be transmitted to an MDCT circuit 14 and the signals in the frequency range of 0 to 5.5 kHz from the frequency dividing filter 12 are stored in a memory 36 and summed to output correction signals of the input/output error calculating circuit 41 so as to be transmitted to an MDCT circuit 15, for MDCT processing. Outputs of band-based additive nodes 42, 43 and 44 are coupled to the band-based block decision circuits 19, 20 and 21, respectively. Outputs of the band-based memories 34, 35 and 36 are also coupled to the input/output error calculating circuit 41.

Among the techniques of dividing the above-mentioned input digital signals into plural frequency bands, there is a QMF filter, for example, as discussed in 1976 R. E. Crochiere Digital Coding of Speech in Sub-bands Bell Syst. Tech. J. Vol. 55 No. 8 1976. The technique of filter division into equal bandwidths is discussed in ICASSP 83, BOSTON Polyphase Quadrature Filters -A New Sub-band Coding Technique Joseph H. Rothweiler.

As an examples of the above-described orthogonal transform, there is such orthogonal transform in which input audio signals are divided into time blocks of pre-set length (frames) and processed with fast Fourier transform (FFT), cosine transform (DCT) or modified DCT (MDCT) for transformation of time-domain signals into frequency-domain signals. Discussions on MDCT may be found in ICASSP 1987 Sub-band/Transform Coding Using Filter Bank Designs Based on Time Domain Aliasing Cancellation J. P. Princen, A. B. Bradley Univ. of Surrey, Royal Melbourne Inst. of Tech.

FIG. 3 shows concrete examples of standard input signals in band-based blocks supplied to the MDCT circuits 13 to 15. In the concrete example of FIG. 3, each of three filter output signals has plural orthogonal block sizes independently in each band and is adapted to be changed over as to the temporal resolution depending on e.g. temporal characteristics or the frequency distribution of the filter output signals. If the signals are temporally pseudo-stationary, the orthogonal transform block size is set to a larger value of 11.6 ms, that is to a long mode shown in FIG. 3A, whereas, if the signals are non-stationary, the orthogonal block size is further divided by factors of two or four. By further dividing the block size into four parts (short mode), with each part being 2.9 ms, as shown in FIG. 3B, or dividing the block size partially into two parts, with each part being 5.8 ms, and partially into four parts, with each part being 2.9 ms (middle mode), as shown in FIGS. 3C and 3D, complex input signals as actually met may be accommodated fairly satisfactorily. Further complex division of the orthogonal block size is evidently more effective insofar as the processing device scale permits. The block decision is made in the block size decision circuits 19, 20 and 21 and transmitted to the MDCT circuits 13, 14 and 15, while being outputted at output terminals 28, 29 and 30 as the block size information of the respective blocks.

Figure 4:
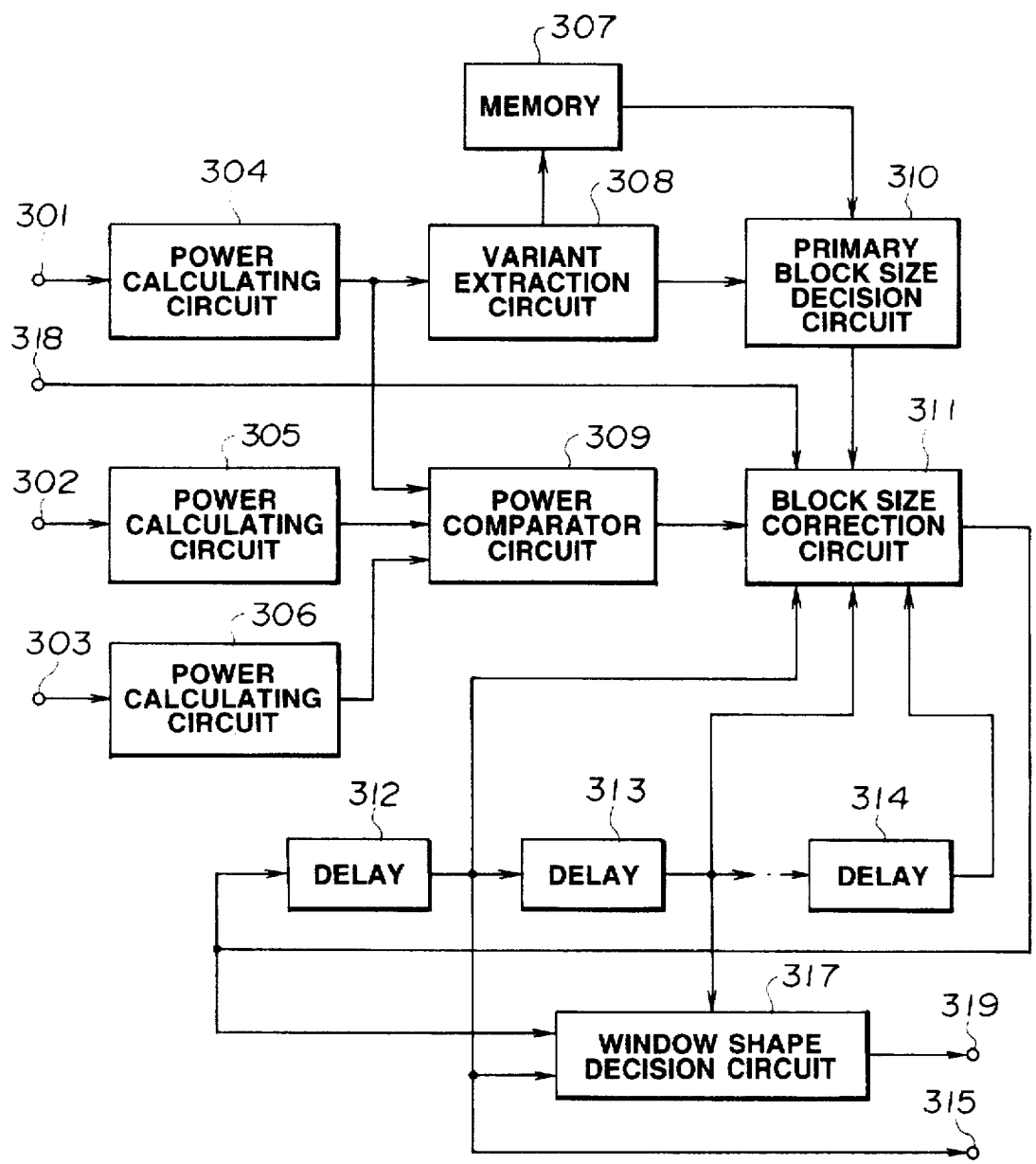
FIG. 4 is a block circuit diagram showing an illustrative example of a circuit for deciding the orthogonal transform block size.

The block size decision circuits are shown in detail in FIG. 4. The block decision circuit 19 shown in FIG. 2 is taken as an example. Of the outputs of the frequency dividing filter 11 shown in FIG. 2, the output in the range of 11 to 22 kHz is supplied via an input terminal 301 in FIG. 4 to a power calculating circuit 304, while the output in the range of 5.5 to 11 kHz is supplied via an input terminal 302 in FIG. 4 to a power calculating circuit 305 and the output in the range of 0 to 5.5 kHz is supplied via an input terminal 303 in FIG. 4 to a power calculating circuit 306.

The block size decision circuits 20, 21 are the same in operation as the block size decision circuit 19, except that the signals entered at the input terminals 301 to 303 are different from those of the decision circuit 19. The input terminals 301 to 303 in each of the block size decision circuits 19 to 21 are of a matrix configuration in the sense that the 5.5 kHz to 11 kHz output and the 0 kHz to 5.5 kHz output are connected to the input terminals 301 and 302 of the block size decision circuit 20, respectively. The same may be said of the block size decision circuit 21.

In FIG. 4, the power calculating circuits 304, 305 and 306 find the powers in the respective bands by integrating the input temporal waveforms for a pre-set time duration. The integration time duration needs to be shorter than the minimum time block of the above-mentioned block sizes. Besides the above calculating method, the absolute value of the maximum amplitude or the mean value of the amplitudes in a minimum time width of the orthogonal block sizes may also be employed as the representative power value.

An output of the power calculating circuit 304 is supplied to a variant extraction circuit 308 and a power comparator circuit 309, while outputs of the power calculating circuits 305, 306 are supplied to a power comparator circuit 309. The variant extracting circuit 308 finds the differential coefficient of the power supplied from the power calculating circuit 304 to supply the coefficient thus found to a primary block size decision circuit 310 and to a memory 307 as the power variant information.

The memory 307 stores the power variation information supplied from the extraction circuit 308 for a time duration longer than the maximum time duration of the above-mentioned orthogonal transform block sizes, because the temporally consecutive orthogonal transform blocks affect one another by the windowing operation during the orthogonal transform and hence the power variation information of the immediately temporally preceding block is required by the primary block size decision circuit 310. Based on the power variation information of the block in subject, that is the current block, supplied from the variant extracting circuit 308, and the power variation information for the immediately preceding block from the memory 307, the primary block size decision circuit 310 finds the orthogonal transform block size for the relevant frequency band from the temporal variation of the power within the relevant frequency band. If the variation in excess of a pre-set value is produced, the orthogonal transform block size of a shorter time duration is selected. However, similar effects may also be produced if the point of variation remains fixed. More favorable effects could be obtained by setting the block size so as to be proportionate to the frequency in such a manner that the block size is of shorter time duration with a larger variation for a higher frequency and of a shorter time duration with a smaller variation for a lower frequency. Although smooth transition is desirable, it is also possible to use plural step-like changes. The block sizes determined as described above are transmitted to a block size correction circuit 311.

On the other hand, the power comparator circuit 309 compares the band-based power data from the power calculating circuits 304 to 306 both concurrently and for a time duration during which the masking effect is manifested on the time axis to find the influence exerted on the output band of the power calculating circuit by the other bands to transmit the influence to the block size correction circuit 311.

Based on the masking information supplied from the power comparator circuit 309 and on the past block size information supplied from taps of groups of delay units 312 to 314, the block size correction circuit 311 corrects the block size so that a block size longer than the block size supplied from the primary block size decision circuit 310 is selected, and transmits the selected block size to the delay units 312 and to a window shape decision circuit 317. The operation by the block size correction circuit 311 is based on the fact that, if an objectionable pre-echo is produced in a given frequency band, but there exists a signal of a larger amplitude in other frequency bands, above all, in a frequency band lower in frequency than the given frequency band, the pre-echo may become imperceptible or less objectionable under the masking effect.

The masking means the phenomenon in which certain signals are masked by other signals and become inaudible due to characteristics of the human aural sense. The masking effect may be classified into time-domain masking effect produced by the time-domain audio signals and concurrent masking effect produced by the frequency-domain signals. By this masking, any noise present in a masked portion becomes inaudible. In actual audio signals, the noise within the masked range is an allowable noise.

The groups of the delay units 312 to 314 store the past orthogonal transform block sizes sequentially and output the stored block size values to the block size decision circuit 311. Simultaneously, outputs of the delay units 312 are coupled to an output terminal 315, while outputs of the delay units 312, 313 are coupled to a window shape decision circuit 317.

The outputs of the delay units 312 to 314 play the role of enabling the block size change of a longer time duration to be utilized in the block size correction circuit 311 in deciding the block size. For example, if the block sizes of short time durations are selected frequently in the past, the block sizes of short time duration are enabled to be selected, whereas, if the block sizes of short time durations are not selected in the past, the block sizes of longer time duration are enabled to be selected.

Meanwhile, except for the delay units 312, 313 associated with the window decision circuit 317 and the output terminal 315, the number of taps of the delay units may occasionally be increased or decreased depending on the constitution and scale of the actual device. The window shape decision circuit 317 selects from the output of the block size correction circuit 311, that is from the block size of the block directly temporally succeeding the relevant block, the output of the delay unit 312, that is the block size of the block in subject, and the output of the delay unit 313, that is the block size of the block directly temporally preceding the relevant block, the shape of the window employed by the MDCT circuits 13 to 15 shown in FIG. 2, and outputs the window shape thus selected at an output terminal 319. The block size information at the output terminal 315 and the window shape information at the output terminal 319 are supplied to various components of the device as outputs of the block size decision circuits 19 to 21.

Figure 5A:
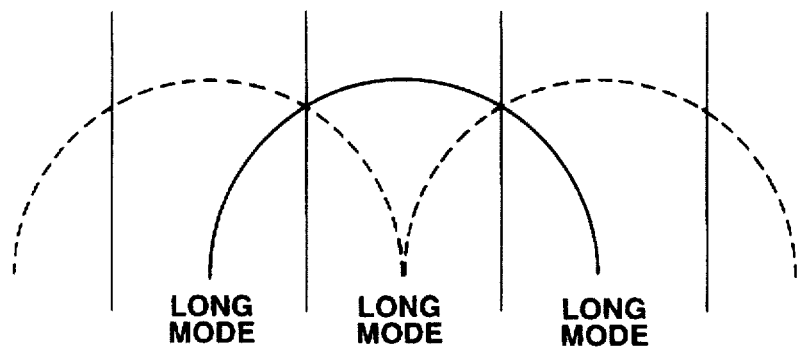
FIGS. 5a to 5c show the relation between changes in the temporal lengths of temporally neighboring orthogonal transform blocks and the window shape employed during orthogonal transform.
Figure 5B:
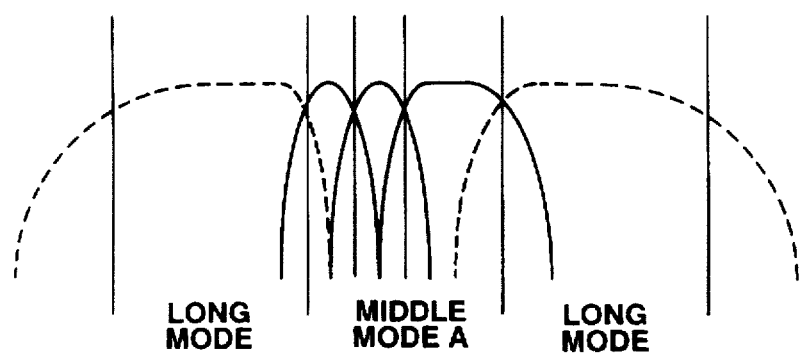
Figure 5C:
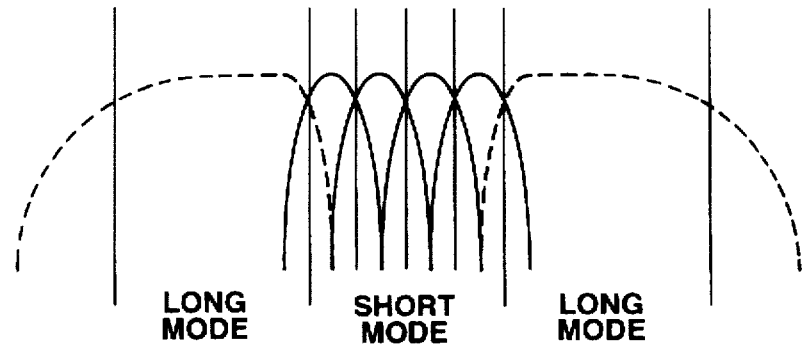

The shape of the window as selected by the window shape decision circuit 317 is hereinafter explained. FIGS. 5a to 5c show the window shapes in conjunction with neighboring blocks. The windows employed for orthogonal transform have portions overlapping with each other between temporally neighboring blocks, as indicated by solid and broken lines in FIG. 5. Since the overlapping shapes up to the center of the neighboring blocks are used in the present embodiment, the window shape is changed depending on the orthogonal transform sizes of the temporally neighboring blocks.

Figure 6:
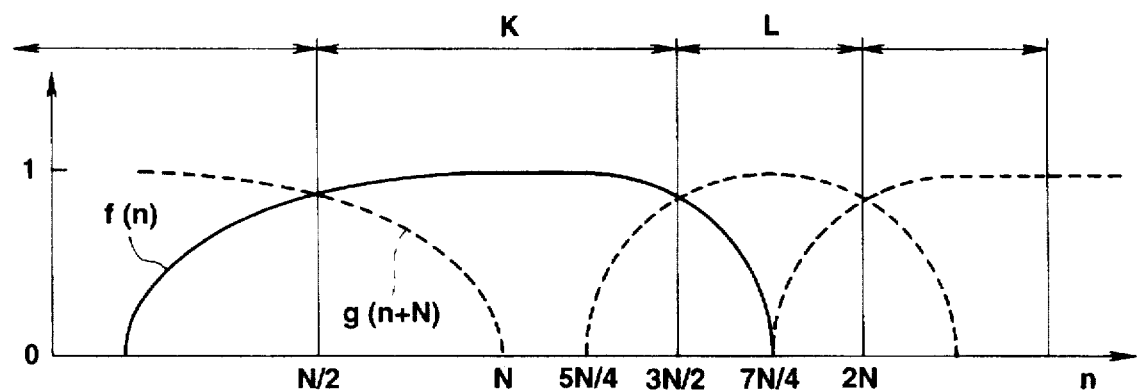
FIG. 6 shows the window shape used for orthogonal transform in detail.

FIG. 6 shows details of the window shape. In FIG. 6, a window functions f(n) and g(n+N) are given as functions satisfying the following equations (i):

$$f(n) \times f(L - 1 - n) = g(n) \times g(L - 1 - n) \quad (1)$$
$$f(n) \times f(n) + g(n) \times g(n) = 1 \ldots 0 \leq n \leq L - 1$$

In the above equation (1), L directly represents the transform block length if neighboring transform block lengths remain the same. If the neighboring transform block lengths differ, it is assumed that a shorter one of the transform block length is L and a longer transform block length is K, and the following equation (2)

$$f(n)=g(n)=1 \ K \leq n \leq 3K/2-L/2 \ f(n)=g(n)=0 \ 3K/2+L \leq n < 2K \quad (2)$$

holds. Thus, by selecting the window overlapping length to be of a longer length, it become possible to improve the frequency resolution of the spectrum during the orthogonal transform. It is seen from above that the shape of the window employed for orthogonal transform is determined after the orthogonal transform sizes of three temporally consecutive blocks are determined.

Consequently, there is a difference corresponding to one block between the block of the signals entered at the input terminals 301, 302 and 303 in FIG. 4 and the block of the signals outputted at the output terminals 315, 319.

The block size decision circuits 19, 20 and 21 in FIG. 2 may be constituted on omission of the power calculating circuits 305, 306 and the power comparator circuit 309 in FIG. 4. Besides, by using only the temporally smallest possible block size of the orthogonal transform blocks, only one window shape may be used, in which case the groups of the delay units 312 to 314, block size correction circuit 311 and the window shape decision circuit 317 may be omitted. Above all, in a practical application in which delay of the processing time is not desirable, less delay may be advantageously produced by omission of the above components.

Meanwhile, although the frequency division prior to orthogonal transform is directly employed in the present embodiment in order to take into account the masking state of the pre-echo as described above, more satisfactory results may be obtained if masking calculations are executed using independent orthogonal transform or the frequency division into a larger number of bands. Besides, although temporal periodic changes in the input signals, as obtained by observing the changes for longer time periods as described above, may be realized by storing the orthogonal transform sizes of past blocks, more satisfactory results may also be obtained by employing data resulting from orthogonal transform distinct from that used for the compression process or data resulting from division of the frequency region into a larger number of bands.

Returning to FIG. 2, low frequency components of the frequency-domain spectral data or MDCT coefficient data, obtained on MDCT processing by MDCT circuits 13 to 15, are grouped for each of the critical bands, while mid to high frequency components thereof are sub-divided from the critical bands in consideration of block floating efficiency and supplied to adaptive bit allocation encoding circuits 22, 23 and 24 and to the bit allocation calculating circuit 18. The critical bands mean the frequency bands divided in order to take the characteristics of the human aural sense into account, and denote the bands proper to the narrow-band noise which masks a pure tone of the same intensity as the noise and which has the frequency in the vicinity of the noise. With the critical bands, the bandwidths become broader towards the higher frequencies, with the total audible frequency range being divided into 25 critical bands.

The bit allocation calculating circuit 18 calculates, in view of the masking effect, the amounts of masking for each critical band and each band divided from the critical band to take into account the block floating based on the spectral data divided to take into account the above-mentioned critical bands and block floating. Besides, the bit allocation calculating circuit 18 calculates the numbers of allocated bits for the respective bands, based on the energies or peak values for each of the critical bands and the bands divided from the critical bands to take the block floating into account, and on the amounts of masking, and transmits the resulting information to the adaptive bit allocation and encoding circuits 22, 23 and 24. Besides, the allowable noise information as found during calculation of the number of allocation bits is stored in a memory 41. The spectral data or MDCT coefficient data is quantized depending on the number of bits allocated to each band by the adaptive bit allocation and encoding circuits 22, 23 and 24. The data thus coded is outputted to decoding circuits 31, 32 and 33, the function of which is to feed back the data to the bit allocation calculating unit.

The decoding circuits 31 to 33 restore the data coded by the adaptive bit allocation encoding circuits 22 to 24 into frequency-domain data, while executing the inverse MDCT operation to find time-domain data associated with the respective bands to supply the resulting time-domain data to the input/output error calculating circuit 41.

The input/output error calculating circuit 41 subtractively sums the time signal waveform supplied from the decoding circuits 31 to 33 and the signal waveform stored in the memories 34 to 36 and delayed for phase matching with the output signals from the decoding circuits 31 to 33 to find error therebetween to generate correction data. These correction data may be so formulated as to assure the minimum value of the input/output error at all times. Alternatively, the correction data may also be so formulated as to provide a minimum value of the difference from the value of particular characteristics, such as the allowable noise characteristics, as found in the bit allocation calculating circuit 18. Still alternatively, the correction data may be such data as will cancel the errors of the processing system, with the bit allocation remaining fixed. One or more of these methods may also be used in combination.

The correction data are outputted to the band-based additive nodes 42, 43 and 44 and summed to the band-based time-domain data stored in the memories 34 to 36 for subsequent second MDCT processing. If the bit allocation is to be calculated a second time, the frequency-domain signals or MDCT coefficients, resulting from the second MDCT processing, are transmitted to the bit allocation calculating circuit 18 where the bit allocation for each band is determined and supplied to the adaptive bit allocation encoding circuits 22 to 24.

The adaptive bit encoding circuits 22 to 24 quantize the frequency-domain information, stored in the memories 37 to 39 in a state prior to addition to the correction data, by the band-based bit allocation supplied from the bit allocation calculating circuit 18. If the bit allocation should remain fixed during the processing, the frequency-domain signals or MDCT coefficients, thus MDCT processed a second time, are transmitted via the memories 37 to 39 to the adaptive bit allocation encoding circuits 22 to 24 where they are quantized on the basis of the bit allocation information stored in the memory 40 and outputted from the bit allocation calculating circuit 18. Consequently, if the bit allocation is calculated a second time, the bit allocation is again calculated, in which case the data to be quantized is the data prior to correction. The corrected data outputted from the input/output error calculating circuit 41 is such information in which a larger number of bits are artificially allocated to data portions replete with input/output errors. If the bit allocation remains fixed during processing, the corrected data is quantized, in which case the corrected data outputted by the input/output error calculating circuit 41 is such information as annuls the input/output error.

The subsequent operation is a desired number of times of repetition of the above described procedure. By such plural processing operations, it becomes possible to produce compressed signals suited to the input signals even although the models for the auditory sense and/or the constants for bit allocation, occasionally employed, are not optimized.

As described above, the compressing operation of the present embodiment is based on the feedback configuration, the conditions of termination or convergence for which may include i) the time allowed for processing the processing block, herein 11.6 msec, ii) the output correction information of the input/output error calculating circuit 41 being of a constant value or less, and iii) the output correction information of the input/output error calculating circuit 41 not being decreased after a plurality of re-compressing operations.

If the input signals are stationary, that is if the long mode as shown at A in FIG. 3 is selected, the output correction information for the temporally preceding block, outputted from the input/output error calculating circuit 41, may be employed as the feedback data. Besides, the allowable noise information for plural past processing blocks may also be stored in the memory 40 in FIG. 2 for further optimizing the bit allocation. If a large capacity external storage device, such as a hard disc, is employed in place of the memory 40, the information continuing for a longer time duration may be stored, so that, when compressing the signals recorded on a recording medium or the like, bit allocation may be optimized in advance by a tentative compression without constraint as to the processing time duration.

Although the foregoing description has been made separately for each of the memories 34 to 36 and 37 to 41, these memories may also be mounted on one and the same chip. The feedback position is not limited to that exemplified in the present embodiment. For example, the feedback position may be located between the frequency dividing filter 11, such as the QMF filter, and the input terminal 10. In this case, it suffices if the memories 34 to 36 are shifted to positions between the input terminal 10 and the feedback position and the IQMF circuit for synthesizing the various frequency bands are inserted between the decoding circuits 31 to 33 and the input/output error calculating circuit 41. Besides, since the ATC decoder 73 in FIG. 1 and the decoding circuits 31 to 33 in FIG. 2 are equivalent components, these components may be used in common for applications in which the compression and expansion circuits exist together on one and the same casing.

Figure 7:
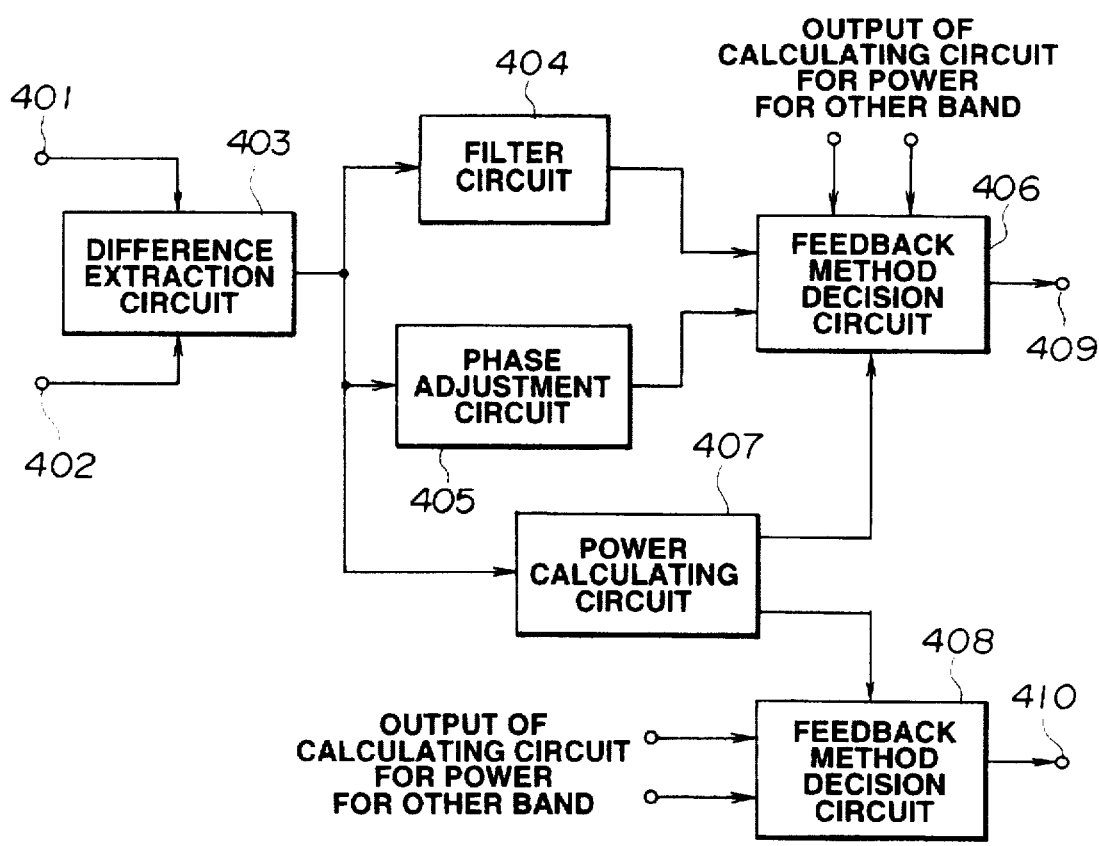
FIG. 7 is a block circuit diagram showing an illustrative example of an input/output error calculating circuit as an essential component of the feedback structure.

FIG. 7 shows, in a block circuit diagram, a typical constitution of the input/output error calculating circuit 41.

The circuit shown in FIG. 7 is for one frequency band such that three of the circuits shown in FIG. 7 make up the input/output error calculating circuit 41 shown in FIG. 2.

An input terminal 401 in FIG. 2 is connected to outputs of the memories 34 to 36 shown in FIG. 2. That is, it is the delayed input signals that are entered at a difference extracting circuit 403. On the other hand, an output 402 is connected to outputs of the decoding circuits 31, 32 and 33, such that signals compressed and subsequently expanded are entered at the difference extraction circuit 403.

These two input signals are subtractively summed in the difference extraction circuit 403 for extracting the difference. At this time, the input signal entered from the decoding circuit is to be subtracted from the delayed input signal. The difference information produced by the difference extraction circuit 403 is entered at a filter circuit 404 for re-calculating the bit allocation, a phase adjustment circuit 405 for providing for fixed bit allocation, and a power calculating circuit 407.

The filter circuit 404 formulates data in such a manner that a larger number of bits as calculated by the bit allocation calculating circuit 18 is allocated to an error-rich data portion. Since any changes in phase components become an error at the time of addition, it is necessary for the phase component to be free of changes.

The correction data formulated by the filter circuit 404 and the phase adjustment circuit 405 are transmitted to a feedback method decision circuit 406 and to the power calculating circuit 407.

The power calculating circuit 407 integrates the difference information supplied from the difference extraction circuit 403 based on a processing block to calculate the power, while formulating the information on the selection of the feedback method to transmit the formulated information to the feedback method decision circuit 408. It would be effective to execute the integration with weighting according to the frequency bands.

The feedback method decision circuit 406 selects, based on the information on the selection of the feedback information supplied from the band-based power calculating circuit 407, the feedback method common to the totality of the frequency bands, and outputs correction data conforming to the selection at an output terminal 409. Although the selection may be implemented by the majority decision system, it would be more effective to use weighting preferentially for lower bands.

A feedback end decision circuit 408 decides, based on the information on the decision as to the end of the feedback transmitted from the band-based power calculating circuit, whether or not the feedback is to be continued, and outputs the result of decision at an output terminal 410. The decision given herein is the decision concerning the second and third convergence conditions above referred to and the feedback is terminated when the power of the difference information falls below a pre-set value or reaches the lower most point.

Figure 8:
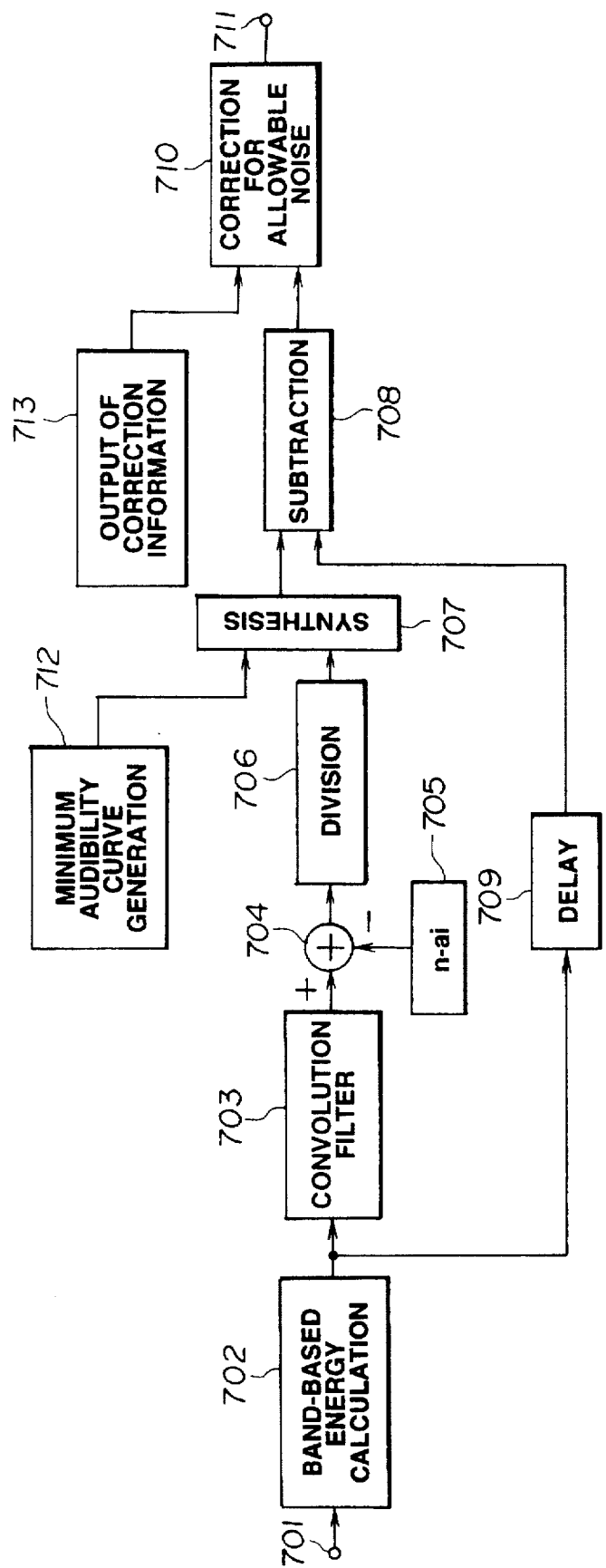
FIG. 8 is a block circuit diagram showing a concrete constitution for implementing the bit distribution arithmetic function.

FIG. 8 shows, in a schematic block circuit diagram, a concrete example of the bit allocation calculating circuit 18.

Figure 9:
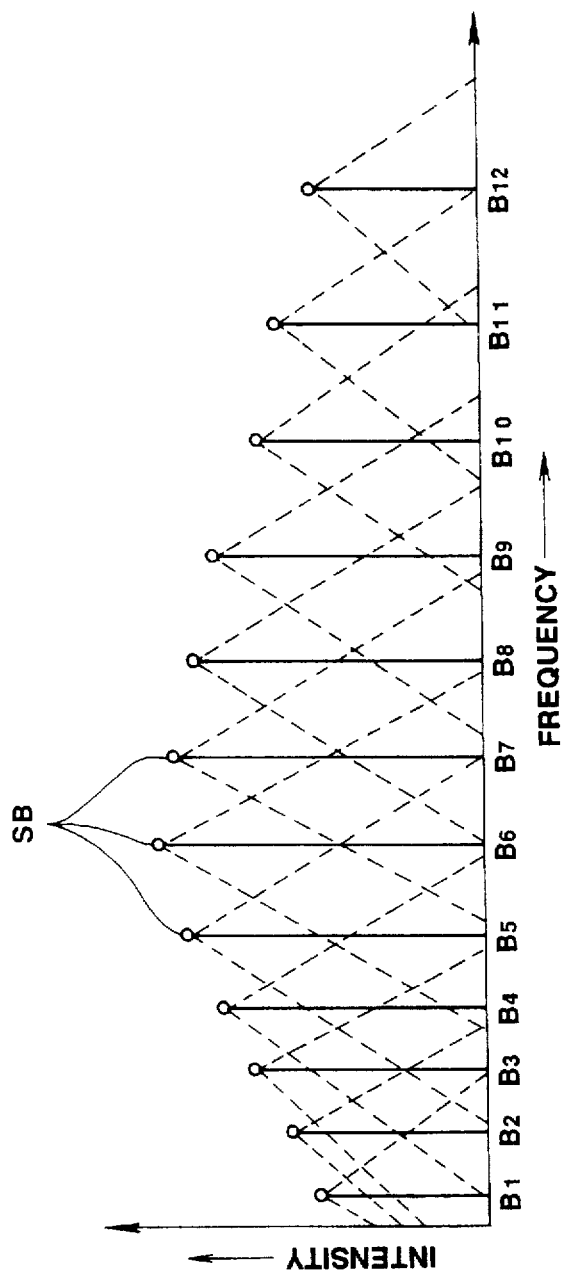
FIG. 9 is a graph showing the spectrum of the critical bands and the frequency bands obtained by division of the critical bands for taking the block floating into account.

In this figure, the frequency-domain spectral data from the MDCT circuits 13 to 15 are supplied to an input terminal 701. Tm frequency-domain input data is transmitted to a band-based energy calculating circuit 702 in which the energies of the critical bands and the bands divided from the critical bands to take into account the block floating and the amounts of masking are found by calculating the sum total of the amplitudes in the respective bands. The amplitude peak values or mean values may also be employed in place of the energies in the respective bands. Each spectral component indicating the sum value of the amplitudes of each of the respective bands is indicated as SB in FIG. 9 as an output of the energy calculating circuit 702. In FIG. 9, 12 bands B1 to B12 are shown as indicating the critical bands and the bands sub-divided from the critical bands to take into account the block floating, and the amounts of masking, for simplifying the drawing.

Figure 10:
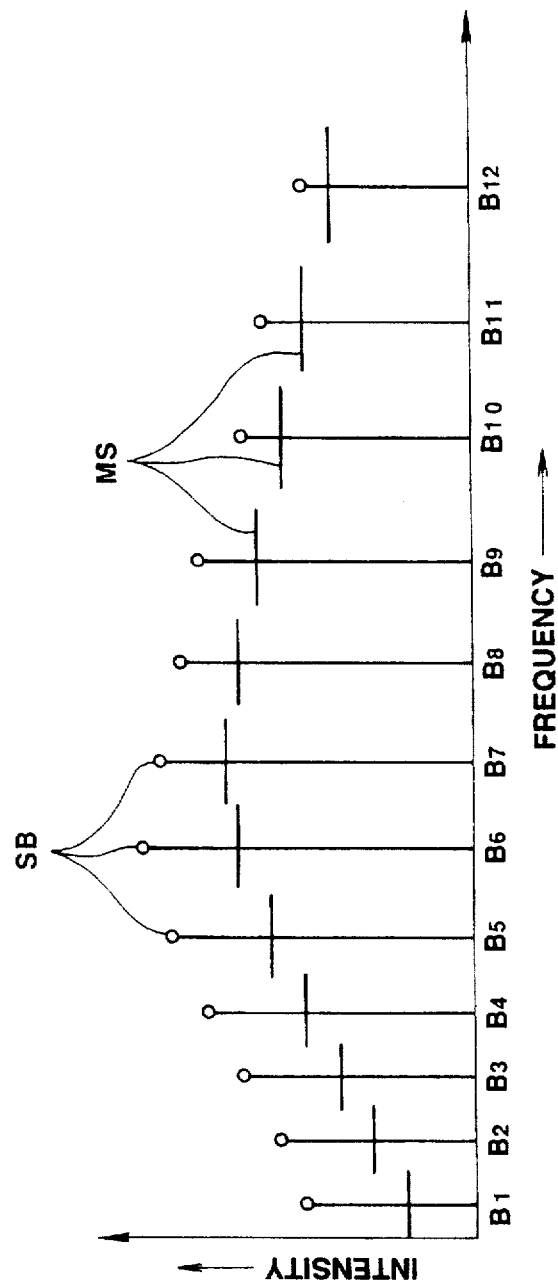
FIG. 10 is a graph showing the masking spectrum.

It is noted that an operation of multiplying each spectral component SB by a pre-set weighting function for taking into account the effects of masking is now performed by way of convolution. To this end, an output of the band-based energy calculating circuit 702, that is each value of the spectral component SB, is transmitted to a convolution filter circuit 703. The convolution filter circuit 703 is made up of a plurality of delay elements for sequentially delaying input data, a plurality of multipliers, such as 25 multipliers associated with the respective bands, for multiplying outputs of the delay elements with filter coefficients or weighting functions, and an adder for finding the sum of the outputs of the respective multipliers. By such convolution, the sum of the portions indicated by broken lines in FIG. 10 is found.

By way of a concrete example of multiplication coefficients or filter coefficients of the respective filters of the convolution filter circuit 703, if the coefficient of a multiplier M for an arbitrary band is 1, outputs of the delay elements are multiplied by coefficients 0.15, 0.0019, 0.0000086, 0.4, 0.06 and 0.007 at the multipliers M−1, M−2, M−3, M+1, M+2 and M+3, M being an arbitrary integer of from 1 to 25, for performing convolution of the spectral components SB.

An output of the convolution filter circuit 703 is transmitted to a subtractor 704 for finding a level a corresponding to the allowable noise level in the convolved region. Meanwhile, the allowable noise level a is such a level which will give an allowable noise level for each of the critical bands by deconvolution as will be described subsequently. The subtractor 704 is supplied with an allowance function (a function representative of the masking level) for finding the level a. The level a is controlled by increasing or decreasing the allowance function. The allowance function is supplied from a (N−ai) function generator 705 now to be explained.

That is, the level a corresponding to the allowable noise level is found from the equation (3):

$$\alpha = S - (n - ai) \quad (3)$$

where i is the number accorded sequentially to the critical bands beginning from the lower side, n and a are constants where a>0 and S the intensity of the convolved Bark spectrum. In the equation (1), (n−ai) represents the allowance function. In the present embodiment, by setting so that n=38 and a=1, optimum encoding may be achieved without deterioration in the sound quality.

The level a is found in this manner and transmitted to a divider 706 for deconvolving the level a in the convolved region. By this deconvolution, the masking spectrum is found from the level a. This masking spectrum becomes the allowable noise level. Although the deconvolution necessitates complex arithmetic-logical steps, it is performed in the present embodiment in a simplified manner by using the divider 706.

The masking spectrum is transmitted via a synthesizing circuit 707 to a subtractor 708 which is supplied with an output of the band-based energy detection circuit 702, that is the above-mentioned spectral components SB. The subtractor 708 subtracts the masking spectrum from the spectrum SB for masking the portions of the spectral components SB lower than the level of the masking spectrum MS, as shown in FIG. 10.

An output of the subtractor 708 is outputted via an allowable noise correction circuit 710 at an output terminal 711 and thence transmitted to a ROM, not shown, in which the information concerning the number of the allocated bits is stored previously. The ROM outputs the information concerning the number of allocated bits for each band, depending on an output of the subtraction circuit 708 supplied via an allowable noise correction circuit 710, that is on the level of a difference between the energies of the respective bands and outputs of the noise level setting means. The information concerning the number of the allocated bits is transmitted to the adaptive bit allocation and encoding circuits 22 to 24 to permit the frequency-domain spectral data from the MDCT circuits 13 to 15 (FIG. 2) to be quantized with the numbers of bits allocated to the respective bands.

In sum, the adaptive bit allocation and encoding circuits 22 to 24 (FIG. 2) quantize the band-based spectral data with the numbers of bits allocated depending on the amounts of masking and the level of the difference between the output of the noise level setting means and the energies in the critical bands and the bands divided from the critical bands to take the block floating into account. The delay circuit 709 (FIG. 9) is provided for delaying the spectral components SB from the energy detection circuit 702 in consideration of the delay produced in the circuitry upstream of the synthesizing circuit 707.

Figure 11:
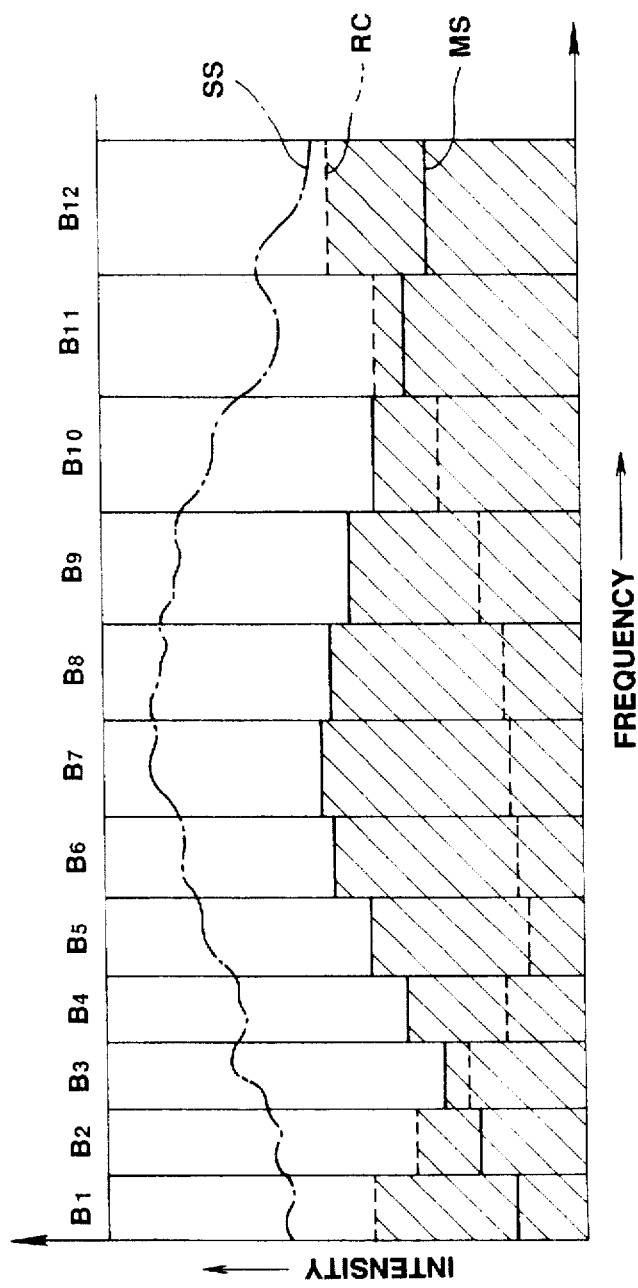
FIG. 11 is a graph which synthesizes the minimum audibility curve and the masking spectrum.

The synthesizing circuit 707 synthesizes the masking spectrum MS and data from the minimum audibility curve RC from the minimum audibility curve generating circuit 712 representing characteristics of the human aural sense as shown in FIG. 11. If the absolute noise level is lower than the minimum audibility curve, the noise becomes inaudible. The minimum-audibility curve differs with the difference in the replay level even although the coding is made in the same manner. However, since there is no marked difference in the manner of entering into the 16-bit dynamic range in music in actual digital systems, it may be presumed that, if the quantization noise of the frequency range in the vicinity of 4 kHz most perceptible to the ear is not heard, the quantization noise lower than the level of the minimum audibility curve is not heard in any other frequency range. Assuming that the recording/replay device is employed so that the noise in the vicinity of 4 kHz of a word length owned by the system is not heard, and the allowable noise level is to be obtained by synthesizing the minimum audibility curve RC and the masking spectrum MS, the allowable noise level may be up to the level indicated by hatched lines in FIG. 11. In the present embodiment, the level of 4 kHz of the minimum audibility curve is matched to the minimum level corresponding to e.g. 20 bits. In FIG. 11, there is also shown the signal spectrum SS.

Besides, the allowable noise correction circuit 710 corrects the allowable noise level in the output of the subtractor 708 based on the information of the equal-loudness curve transmitted from a correction information outputting circuit 713. The equal-loudness curve is a characteristic curve concerning characteristics of human aural sense, and is obtained by finding the sound pressures of the sound at the respective frequencies heard with the same loudness as the pure tone of 1 kHz and by connecting the sound pressures by a curve. It is also known as an equal loudness sensitivity curve. The equal-loudness curve also delineates a curve which is substantially the same as the minimum audibility curve shown in FIG. 11. With the equal-loudness curve, the sound in the vicinity of 4 kHz is heard with the same loudness as the sound of 1 kHz, even although the sound pressure is decreased by 8 to 10 dB from the sound of 1 kHz. Conversely, the sound in the vicinity of 50 kHz cannot be heard with the same loudness as the sound of 1 kHz unless the sound pressure is higher by about 15 db than that of the sound of 1 kHz. Thus it may be seen that the noise in excess of the level of the minimum audibility curve and within the allowable noise level preferably has frequency characteristics represented by a curve conforming to the equal-loudness curve. Thus it may be seen that correction of the allowable noise level in view of the equal-loudness curve is in conformity to the characteristics of the human aural sense.

Meanwhile, the correction information outputting circuit 713 may be designed to correct the allowable noise level based on the information of the error between the detection output of the volume of the output information (data quantity) at the time of quantization at the adaptive bit allocation and encoding circuits 22 to 24 and the target bit rate of the ultimately encoded data. There are occasions where the total number of bits as obtained by temporary adaptive bit allocation for the totality of the bit allocation unit blocks is different from the pre-set number of bits (target number of the bits) as determined by the bit rate of the ultimate encoded data and hence the bit allocation is again made so that the difference becomes equal to zero. That is, if the total number of allocated bits is less than the target number of the bits, the bits corresponding to the difference are additively allocated to respective unit blocks, whereas, if the total number of allocated bits is larger than the target number of the bits, the bits corresponding to the difference are deductively allocated to the respective unit blocks.

To this end, an error of the total number of allocated bits from the target number is detected and correction data for correcting the number of allocated bits is outputted by the correction information output circuit 713 depending on the error data. If the error data indicates the shortage of the number of bits, it is probable that more bits are employed per unit block so that the amount of the data is in excess of the target number of bits. If the error data indicates an excess of the number of bits, it is probable that a smaller number of bits per unit block suffices so that the amount of the data is less than the target number. Consequently, the correction information outputting circuit 713 is responsive to the error data to output the data of correction values by which the allowable noise level at an output of the subtractor 708 is corrected based on the information of the equal-loudness curve.

The correction values are transmitted to the allowable noise correction circuit 710 for correcting the allowable noise from the subtractor 708. With the above-described system, data obtained by processing the orthogonal transform output spectrum by the subsidiary information for quantization is obtained as the main information, while the scale factor indicating the state of block floating or the word length data are produced as the subsidiary information for quantization. The main information and the subsidiary information are transmitted from the encoder to the decoder.

Figure 12:
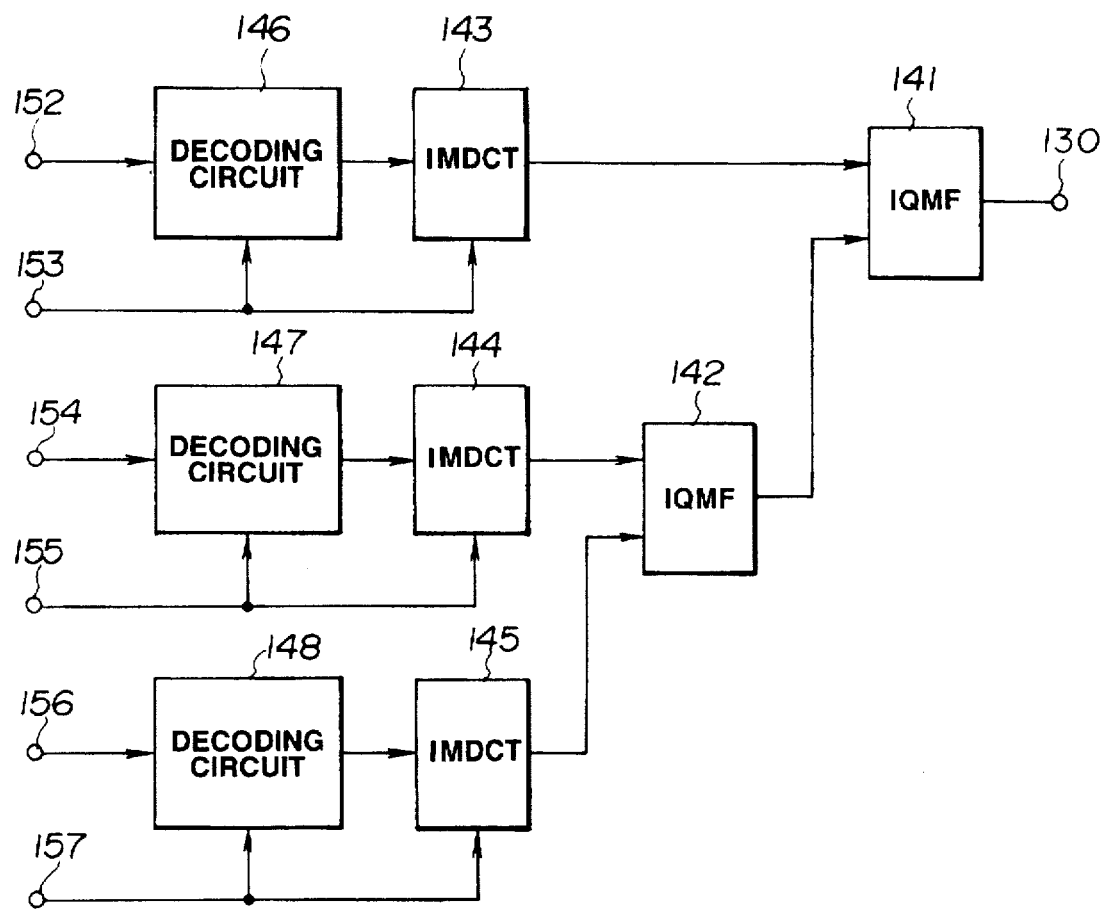
FIG. 12 is a block circuit diagram showing a concrete example of a high efficiency compression coding decoder that may be used for bit rate compression and coding for the present embodiment.

FIG. 12 shows the ATC decoder 73 shown in FIG. 1, that is decoding circuits for re-combining the above-mentioned high efficiency encoded signals. The quantized MDCT signals of the respective bands, that is data equivalent to the output signals at the output terminals 25 to 27 in FIG. 2, are supplied to input terminals 152, 154 and 156, respectively, while the block size information, that is data equivalent to output signals at the output terminals 28 to 30 in FIG. 2, are supplied to input terminals 153, 155 and 157, respectively. Decoding circuits 146, 147 and 148 annul the bit allocation using the adaptive bit allocation information. The frequency-domain signals are transformed by IMDCT circuits 143, 144 and 145 into time-domain signals. These partial range time domain signals are decoded by IQMF circuits 142 and 141 into full-range signals which are outputted at an output terminal 140.

The present invention is not limited to the above-described embodiments. For example, the two recording/replay media may be interconnected by a data transfer cable without it being necessary to have the two media built into one system. The present invention may be applied not only to audio PCM signals but also to digital speech signals or digital video signals. The synthesis of the above-mentioned minimum audibility curve may also be omitted, in which case the minimum audibility curve generating circuit 712 or the synthesizing circuit 707 may be omitted and an output of the subtractor 704 may be directly transmitted to the subtractor 708 after deconvolution by the divider 706. Besides, a wide variety of bit allocation techniques may be employed, such as the fixed bit allocation, bit allocation based on signal band energies or bit allocation consisting in the combination of the fixed bit allocation and the variable bit allocation.

It is seen from above that, with the use of the compression device having the feedback structure according to the present invention, it becomes possible to produce compression signals suited to input signals for a device for compressing, recording, expanding and/or transmitting the input signals, even in cases where a pre-set model for the auditory sense and/or a pre-set constant is not suited to the input signals, or where the input signals are unanticipated signals.

What is claimed is:

1. An apparatus for generating compressed data, comprising:
   a memory for storing input data, the input data representative of input signals;
   a compressor for compressing the stored input data to generate compressed data;
   a node for providing at least the stored input data to the compressor;
   decoder for expanding the compressed data; and
   an error calculating circuit for generating correction data based upon a difference between the expanded compressed data and the stored input data, wherein the node adds the generated correction data to the stored input data to generate corrected data, and wherein the compressor then compresses the corrected data to generate encoded output data.

2. The apparatus of claim 1, wherein the compressor comprises: a bit allocation circuit operative to adaptively allocate bits as representative of the compressed data.

3. The apparatus of claim 1, wherein the correction data annuls the error produced during compression and expansion.

4. The apparatus of claim 1, wherein the stored input data and the corrected data are divided into processing blocks, further comprising:
   a block size decision circuit operative to determine a length of each processing block based upon a proportion of elements which is one of fixed and adapted to the input signals, said elements being used one of singly and in combination.

5. An apparatus for generating compressed data, comprising:
   a memory for storing input data, the input data representative of input signals;

a compressor for compressing the stored input data to generate compressed data, the compressor including a bit allocation circuit for allocating bits;

a node for providing at least the stored input data to the compressor;

a decoder for expanding the compressed data; and an error calculating circuit for generating correction data based upon a difference between the expanded compressed data and the stored input data, wherein the node adds each new generation of the correction data to the same stored input data to generate successive corrected data, and wherein the compressor then compresses each successive set of corrected data to generate encoded output data.

6. The apparatus of claim 1, 2, 3 or 5, wherein the stored input data and the corrected data are divided into processing blocks, further comprising:

a block size decision circuit operative to determine a length of each processing block, wherein the length of each processing block is rendered variable in conformity to the input signals and the length of each processing block is determined based upon changes in the input signals corresponding to a processing block under consideration and changes at least one of power, energy and peak information in the input signals corresponding to other processing blocks.

7. The apparatus of claim 6, wherein proportions of participation of elements for determining the length of each processing block are one of fixed and adapted to the input signals, said elements being used one of singly and in combination.

8. The apparatus of claim 6, wherein the input signals are audio signals and frequency widths of at least a majority of blocks subject to the quantization noise are selected to be broader towards higher frequencies.

9. The apparatus of claim 1, 2, 3 or 5, wherein the stored input data and the corrected data are divided into processing blocks, further comprising:

a block size decision circuit operative to determine a length of each processing block, wherein a length of each processing block is rendered variable in conformity to the input signals and the length of each processing block under consideration is determined based upon changes in the input signals of the processing block under consideration and changes in the input signals having a time width longer than the longest processing block.

10. The apparatus of claim 10, wherein proportions of participation of elements for determining the length of each processing block are one of fixed and adapted to the input signals, said elements being used one of singly and in combination.

11. The apparatus of claim 9, wherein the input signals are audio signals and frequency widths of at least a majority of blocks subject to the quantization noise are selected to be broader towards higher frequencies.

12. The apparatus of claim 1, 2, 3, 4 or 4, wherein the encoded output data is at least one of recorded, reproduced, transmitted and received.

13. The apparatus of claim 1, 2, 3, 5 or 4, wherein the input signals are audio signals and frequency widths of at least a majority of blocks subject to the quantization noise are selected to be broader towards higher frequencies.

14. The apparatus of claim 13, wherein the input signals are time-domain signals, further comprising:

at least one orthogonal transformer for transforming the time-domain signals into frequency-domain signals, wherein a shape of a window function employed during orthogonal transform is changed as the orthogonal transform size is changed.

15. The apparatus of claim 14, wherein when the at least one orthogonal transformer transforms time-domain signals into frequency-domain signals, the frequency range is first divided into plural bands by at least one filter, each block consisting of plural samples are formed for each of the bands and the orthogonal transform is performed for each block of each band.

16. The apparatus of claim 15, wherein the frequency widths by which time-domain signals prior to orthogonal transform are divided into plural bands are selected to be higher substantially towards higher frequencies.

17. The apparatus of claim 16, wherein the frequency widths for division are selected to be the same for two lowermost consecutive bands.

18. The apparatus of claim 17, wherein one of main information and subsidiary information in compression coding is allocated to signal components of frequency bands substantially within the signal pass band.

19. The apparatus of claim 18, wherein the orthogonal transformer comprises:

a modified discrete cosine transformer.

20. The apparatus of claim 17, wherein the orthogonal transformer comprises:

a modified discrete cosine transformer.

21. The apparatus of claim 16, wherein the orthogonal transformer comprises:

a modified discrete cosine transformer.

22. The apparatus of claim 15, wherein the at least one filter comprises:

a QMF filter.

23. The apparatus of claim 14, wherein the orthogonal transformer comprises:

a modified discrete cosine transformer.

24. The apparatus of claim 22 wherein the orthogonal transformer comprises:

a modified discrete cosine transformer.

25. The apparatus of claim 15, wherein the orthogonal transformer comprises:

a modified discrete cosine transformer.

26. A method for generating compressed data, comprising the steps of:

storing input data, the input data representative of input signals;

compressing the stored input data to generate compressed data;

expanding the compressed data;

generating correction data based upon a difference between the expanded compressed data and the stored input data;

adding the correction data to the stored input data to generate corrected data; and compressing the corrected data to generate encoded output data.

27. The method claim 26, wherein the step of compressing comprises the step of:

adaptively allocating bits as representative of the compressed data.

28. The method of claim 26, wherein the correction data annuls the error produced during compression and expansion.

29. The method of claim 26, further comprising the steps of:

dividing the stored input data and the corrected data processing blocks; and selecting a length of each processing block based upon a proportion of elements which is one of fixed and adapted to the input signals, said elements being used one of singly and in combination.

30. A method for generating compressed data, comprising the steps of:

storing input data, the input data representative of input signals;

compressing the stored input data to generate compressed data, the step of compressing including allocation of bits;

expanding the compressed data; and generating correction data from a difference between the expanded compressed data and the stored input data, wherein each new generation of the correction data is added to the same stored input data to generate successive corrected data, each set of successive corrected data is compressed, and one of the compressed sets of successive corrected data is output as encoded output data.

31. The method of claim 26, 27, 28 or 30, further comprising the steps of:

dividing the stored input data and the corrected data into processing blocks; and selecting a length of each processing block, wherein the length of each processing block is rendered variable in conformity to the input signals and the length of each processing block is selected based upon changes in the input signals corresponding to a processing block under consideration and changes at least one of power, energy and peak information in the input signals corresponding to other processing blocks.

32. The method of claim 31, wherein proportions of participation of elements for determining the length of each processing block are one of fixed and adapted to the input signals, said elements being used one of singly and in combination.

33. The method of claim 32, wherein the input signals are time-domain signals, further comprising the step of:

transforming the time-domain signals into frequency-domain signals, wherein a shape of a window function employed during orthogonal transform is changed as the orthogonal transform size is changed.

34. The method of claim 33, wherein the step of transforming time-domain signals into frequency-domain signals further comprises the step of:

dividing the frequency range into plural bands, each block consisting of plural samples formed for each of the bands, wherein the orthogonal transform is performed for each block of each band.

35. The method of claim 34, further comprising the step of:

selecting the frequency widths by which time-domain signals prior to orthogonal transform are divided into plural bands to be higher substantially towards higher frequencies.

36. The method of claim 35, further comprising the step of:

selecting the frequency widths for division to be the same for two lowermost consecutive bands.

37. The method of claim 36, further comprising the step of:

allocating one of main information and subsidiary information in compression coding to signal components of frequency bands substantially within the signal pass band.

38. The method of claim 33, wherein the step of orthogonally transforming comprises the step of:

modified discrete cosine transforming.

39. The method of claim 26, 27, 28 or 30, further comprising the steps of:

dividing the stored input data and the corrected data into processing blocks; and selecting a length of each processing block, wherein a length of each processing block is rendered variable in conformity to the input signals and the length of each processing block under consideration is selected based upon changes in the input signals of the processing block under consideration and changes in the input signals having a time width longer than the longest processing block.

40. The method of claim 26, 27, 28 or 30, further comprising the step of:

at least one of recording, reproducing, transmitting and receiving the encoded output data.

41. The method of claim 26, 27, 28 or 30, wherein the input signals are audio signals, further comprising the step of:

selecting frequency widths of at least a majority of blocks subject to the quantization noise to be broader towards higher frequencies.

* * * * *